United States Patent Office 2,969,289
Patented Jan. 24, 1961

2,969,289
YEAST-FREE PREPARED FLOUR MIX

Samuel A. Matz, Chicago, Jason A. Miller, Dolton, and Charles S. McWilliams, La Grange, Ill., assignors to the United States of America as represented by the Secretary of the Army No Drawing. Filed July 17, 1958, Ser. No. 749,305

9 Claims. (Cl. 99—90)

(Granted under Title 35, U.S. Code (1952), sec. 266)

The invention described herein, if patented, may be manufactured and used by or for the Government for governmental purposes, without the payment to us of any royalty thereon.

Our invention relates to a yeast-free prepared flour mix, which by the addition of water can be made into a dough for the production of bread and other bakery products without the use of yeast.

More particulaly, we have found that a yeast-free bread flour mix may be made by adding to conventional ingredients of a prepared flour mix (such as flour, dry shortening, sugar, sodium bicarbonate, acidic leavening agent, and nonfat dry milk solids) a yeast-cell-free flavor preparation produced from sugar and yeast in a manner to be hereafter described.

In the conventional production of yeast-raised bread, it is necessary to add yeast to the dough prepared either by mixing it with the other dough ingredients in situ, or by incorporating dry yeast into a prepared flour mix. This has the disadvantage, particularly in military bakery operations, of handling a relatively storage-unstable product, namely yeast. Attempts to incorporate dry yeast into a prepared flour mix have not met with complete success heretofore because of the tendency of the yeast to react prematurely with the other ingredients of the mix, and because of the aforementioned storage instability of conventional dry yeast. While research conducted by the Army has increased the storage stability of yeast in recent years, it is still not possible to provide a prepared flour mix containing stabilized yeast which is capable of shipment and storage at tropical or semi-tropical temperatures and over prolonged periods of time.

Consequently, we have attacked the problem from a new direction, namely by omitting the yeast altogether in the compounding of the flour mix and in the preparation of the bread dough, and to substitute therefor a dry flavor preparation produced by fermenting a sugar solution in the presence of yeast at a pH of about 6-9, followed by removal of the yeast cells (e.g., by centrifugation) and drying of the remaining liquid (e.g., by lyophilization). The classical formula of sugar fermentation by yeast is:

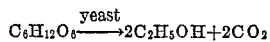

$$C_6H_{12}O_6 \xrightarrow{\text{yeast}} 2C_2H_5OH + 2CO_2$$

with small amounts of by-products such as glycerol and acetic acid (Peterson et al., "Elements of Food Biochemistry," 1943, page 57); however, we have surprisingly found that the flavor preparation made under the stated conditions contains neither alochol nor carbon dioxide. Without committing ourselves to any particular theory, we express the opinion that yeast excretes numerous compounds into the medium during the course of fermentation. Some of these compounds are described by A. C. Neish and A. C. Blackwood, in "Dissimilation of glucose by yeast at poised hydrogen ion concentrations," Can. J. Tech., 29, 123–129 (1951). Many other unidentified compounds are undoubtedly present. Some of these unknown compounds are believed to contribute to the flavoring potentialities of the dry product described in our disclosure.

We will now describe our invention by a practical description of carrying the same into practice, without, however, limiting ourselves to any specific details which may be varied without departing from the spirit of our invention.

*Production of the dry flavor preparation*

A solution of 100 grams of sucrose and 50 grams of dry nonfat milk solids are mixed with a .1 molar solution of disodium phosphate buffer in 1000 ml. of water; 50 grams of compressed yeast (*Saccharomyces cerevisiae*) are added, and the whole is permitted to ferment at 100° F. in a 4-liter flask for 4 hours. During this time the pH drops from 9.0 to about 6.0. The cells are then removed by centrifuging and are discarded. The yeast-cell-free liquid is then lyophilized until the moisture content is reduced to 3%.

Dextrose, fructose, or mixtures thereof may be employed in lieu of or in admixture with sucrose. The dry nonfat milk solids may be omitted in the making of the dry flavor preparation.

Other alkaline buffers, such as glycine or sodium bicarbonate may be used in place of the disodium phosphate buffer. Optimum pH range is about 7–8.5.

The discarded yeast cells may be utilized for fermenting a subsequent batch. Methods of drying other than lyophilization may also be used.

*Compounding of the prepared flour milk*

A typical prepared bread flour mix in accordance with our invention is compounded by mixing the following ingredients:

| | Parts about |
|---|---|
| Flour | 70 |
| Shortening | 5 |
| Sugar | 5 |
| Delta lactone of gluconic acid* | 7 |
| Sodium bicarbonate | 3 |
| Dry nonfat milk solids | 5 |
| Flavor preparation dry yeast-cell-free | 5 |

* Other edible acidic compounds may be used. The criteria for use is that they react completely with sodium bicarbonate under the conditions existing in the dough and that they yield edible, substantially tasteless end products. Examples of other suitable acidic compounds are citric, sodium aluminum pyrophosphate and sodium aluminum phosphate.

The proportions of the ingredients of the flour mix may be varied within relatively wide limits, thus the dry shortening (natural or synthetic) may vary from about 2 to about 9 parts, per 100 parts of the mix, the sugar from about 2 to about 9 parts, the sodium bicarbonate from about 2.5 to about 3.5 parts, the nonfat milk solids from about 1 to about 8 parts, and the dry flavor preparation from about 1 to about 10 parts; the remainder of the mix being flour (e.g., wheat flour, whole wheat flour, rye flour), constituting a major portion of the dry mix. The amount of acidic leavening agent depends on the amount of sodium bicarbonate present and on the identity of the acidic compound itself; it should be present in an amount at least sufficient to react completely with the sodium bicarbonate in the dough, and it should be so adjusted in amount that the finished bread has a pH from about 5 to about 6 (as measured by making a slurry of 10 grams of bread with 100 ml. of distilled water, and measuring the pH of the slurry electrometrically).

*Preparation of the dought*

The prepared flour mix is made into a dough by adding about 50% of water, mixing thoroughly, without the addition of yeast, until the gluten is developed (as determined by visual inspection). The dough is then formed into loaves or rolls of desired size and shape, and heated (e.g., at about 425° F.) until baked.

The volume and texture of a loaf of bread obtained in accordance with our invention is about the same as the volume of good commercial bread (e.g., a yeast-free loaf made from a flour mix containing wheat flour, in accordance with our invention, has about the same texture as a good commercial loaf of white bread). The flavor also is substantially the same as that of good commercial bread, e.g., white bread.

The composition of our yeast-free prepared flour mix may also be varied by incorporating therein spices and/or natural or synthetic flavors, so that baked items such as sweet rolls, etc. may be made therefrom.

Our invention eliminates the fermentation process used in conventional bread-making. As a result, the requirements for storing quantities of dough for periods of two to five hours under conditions of controlled humidity and temperature are eliminated. Several steps in processing are also eliminated, particularly the punching of the fermenting dough. Substantial time, labor and space savings are thus effected.

It will thus be seen that our invention is useful in military and civilian bakery operations. It enables a small military detachment and even an individual soldier to prepare bread and other bakery products in the field without the assistance of a military baker; similarly, a housewife may prepare home-baked bread without the handling of yeast, by using the prepared yeast-free flour mix of our invention. Although we have illustrated and described the preferred form of our invention, it will be obvious that various changes may be made therein without departing from the spirit of the invention or from the scope of the subjoined claims. We therefore, define our invention in the appended claims, which we intend to be construed as broadly as the prior art and the spirit of our invention will permit.

We claim:

1. Yeast-free prepared flour mix for making a yeast-free bakery product characterized by a flavor and texture substantially corresponding to the flavor and texture of a bakery product baked from a yeast dough, comprising a dry mixture of a major portion of flour and minor portions of dry shortening, sugar, sodium bicarbonate, an edible acidic compound capable of reacting with said sodium bicarbonate, nonfat dry milk solids, and a yeast-cell-free dry flavor preparation, said flavor preparation being produced by fermenting a sugar solution in the presence of yeast at a pH of about 6–9, said flavor preparation being substantially free from alcohol and carbon dioxide.

2. Yeast-free prepared flour mix for making a yeast-free bakery product characterized by a flavor and texture substantially corresponding to the flavor and texture of a bakery product baked from a yeast dough, comprising a dry mixture of a major portion of flour and, per 100 parts of said mix, about 2–9 parts dry shortening, about 2–9 parts sugar, about 2.5–3.5 parts sodium bicarbonate, an edible acidic compound capable of reacting with said sodium bicarbonate, said edible acidic compound being present in an amount sufficient to adjust the pH of the bakery product prepared from said mix to about 5–6, about 1–8 parts nonfat dry milk solids, and about 1–10 parts of a yeast-cell-free dry flavor preparation, said flavor preparation being produced by fermenting a sugar solution in the presence of yeast at a pH of about 6–9, said flavor preparation being substantially free from alcohol and carbon dioxide.

3. A prepared flour mix according to claim 2, wherein said edible acidic compound is a member of the group consisting of lactone of gluconic acid, citric acid, sodium aluminum phosphate and sodium aluminum pyrophosphate.

4. Yeast-free prepared flour mix for making a yeast-free bakery product characterized by a flavor and texture substantially corresponding to the flavor and texture of a bakery product baked from a yeast dough, comprising a dry mixture of, per 100 parts of said mix, about 70 parts flour, about 5 parts dry shortening, about 5 parts sugar, about 3 parts sodium bicarbonate, about 7 parts delta latcone of gluconic acid, about 5 parts nonfat milk solids, and about 5 parts of a yeast-cell-free dry flavor preparation, said flavor preparation being produced by fermenting a sugar solution in the presence of yeast at a pH of about 6–9, said flavor preparation being substantially free from alcohol and carbon dioxide.

5. Process of preparing a yeast-cell-free flavor preparation for addition to a prepared flour mix, comprising fermenting a sugar solution in the presence of yeast at pH of about 6–9, removing the yeast cells, and drying the remaining liquid at a temperature non-injurious to the flavor of said preparation so as to obtain a solid substantially free from alcohol and carbon dioxide.

6. Process of preparing a yeast-cell-free flavor preparation for addition to a prepared flour mix for making a yeast-free bakery product characterized by a flavor and texture substantially corresponding to the flavor and texture of a bakery product baked from a yeast dough, comprising fermenting a solution of about 100 parts sugar (on a dry basis) in the presence of about 50 parts compressed yeast and about 50 parts nonfat dry milk solids, said solution being buffered to about 6.0–9, for about 4 hours at about 100° F., then removing the yeast cells, and drying the remaining liquid at a temperature non-injurious to the flavor of said preparation to about 3% moisture contents so as to obtain a solid substantially free from alcohol and carbon dioxide.

7. Process according to claim 6, wherein said buffer is a member of the group consisting of disodium phosphate, glycine and sodium bicarbonate.

8. Process according to claim 6, wherein said sugar is dissolved in about 1000 ml. of a .1 molar solution of disodium phosphate in water.

9. Yeast-free bread baked from a dough comprising the yeast-free prepared flour mix of claim 1, said yeast-free bread being characterized by a flavor and texture substantially corresponding to the flavor and texture of bread baked from a yeast dough.

References Cited in the file of this patent

UNITED STATES PATENTS

| | | |
|---|---|---|
| Re. 23,484 | Johnson | Apr. 29, 1952 |
| 1,244,867 | Laidley | Oct. 30, 1917 |
| 1,449,113 | Hayduck | Mar. 20, 1923 |
| 2,326,134 | Freilich et al. | Aug. 10, 1943 |
| 2,449,401 | Rapaport | Sept. 14, 1948 |
| 2,722,482 | Betts | Nov. 1, 1955 |

OTHER REFERENCES

"Canadian Journal of Technology," February 1951 (vol. 29, No. 2), pages 123 to 128.